United States Patent
Dockter et al.

(10) Patent No.: US 6,611,845 B1
(45) Date of Patent: Aug. 26, 2003

(54) METHOD AND SYSTEM FOR STORING AND MANAGING SETS OF OBJECTS

(75) Inventors: Michael J. Dockter, Wellington, FL (US); Ronald W. Lynn, Gilroy, CA (US); Randal J. Richardt, San Jose, CA (US); Roland Seiffert, Herrenberg (DE)

(73) Assignee: International Business Machines Corporation, Armonk, NY (US)

(*) Notice: Subject to any disclaimer, the term of this patent is extended or adjusted under 35 U.S.C. 154(b) by 166 days.

(21) Appl. No.: 09/620,756

(22) Filed: Jul. 21, 2000

(51) Int. Cl.[7] .............................................. G06F 17/30
(52) U.S. Cl. ................................. 707/103; 707/104.1
(58) Field of Search ......................... 707/10, 100, 102, 707/103 R, 104.1

(56) References Cited

U.S. PATENT DOCUMENTS

| | | | |
|---|---|---|---|
| 5,551,029 A | 8/1996 | Jagadish et al. | 707/103 R |
| 5,692,180 A | 11/1997 | Lee | 707/10 |
| 5,721,911 A | 2/1998 | Ha et al. | 707/100 |
| 5,970,496 A | 10/1999 | Katzenberger | 707/102 |
| 6,006,234 A | 12/1999 | Govindarajan et al. | 707/10 |
| 6,052,688 A * | 4/2000 | Thorsen | 707/100 |
| 6,052,691 A | 4/2000 | Ardoin et al. | 707/102 |
| 6,061,690 A | 5/2000 | Nori et al. | 707/100 |
| 6,112,024 A * | 8/2000 | Almond et al. | 707/203 |
| 6,163,776 A * | 12/2000 | Periwal | 703/22 |
| 6,330,569 B1 * | 12/2001 | Baisley et al. | 703/22 |

* cited by examiner

Primary Examiner—Diane D. Mizrahi
Assistant Examiner—Yicun Wu
(74) Attorney, Agent, or Firm—Sawyer Law Group LLP

(57) ABSTRACT

A system and method for storing and managing sets of objects is disclosed. The method and system comprises providing a plurality of set nodes based upon a defined set of data objects; and associating a plurality of constraint nodes with the plurality of set nodes. The method and system includes providing a plurality of object nodes based upon the objects; and obtaining object metadata from the plurality of object nodes. The method and system further includes associating at least one of the plurality of object nodes with at least one of the plurality of set nodes based upon a criteria and detecting that at least one of the plurality of set nodes has been modified and delivering a notification to at least one constraint node of a plurality of constraint nodes. Each of the plurality of constraint nodes provides constraints on at least one set node. Accordingly, a method and system in accordance with the present invention unifies the storing and managing of sets in order to simplify overall system behavior. The system and method uses an attributed, directed graph model to store object metadata, object-within-set metadata, and set constraints. By using this model, no special cases exist when an object belongs to just one set or hundreds of sets. The operations required to maintain the graph model are the same in every case. The operations required to maintain the metadata and constraints are also the same in every case. The entire model is therefore a unified and simplified system.

20 Claims, 3 Drawing Sheets

METHOD AND SYSTEM FOR STORING AND MANAGING SETS OF OBJECTS

FIELD OF THE INVENTION

The present invention relates generally to data objects in a processing system and more particularly to storing and managing of sets of objects.

BACKGROUND OF THE INVENTION

Data objects are utilized extensively in processing systems that utilize databases. A distinction is made here between data objects that participate in an object-oriented environment and data objects that participate in a set-oriented environment. In the object-oriented programming paradigm, objects are defined by data values and methods that are encapsulated within an object. All of the metadata about the object is kept internally within the object itself. By contrast, in the set-oriented model all of the metadata is kept external to the object. This is needed because each set may impose different requirements of the objects contained in the set. This becomes important when objects belong to more than one set.

It is known that it is important to efficiently manage and store data objects that belong to one or more sets. In particular, it is important to store metadata for an object as required by each set. Also, it is important to enforce constraints on an object as required by each set.

There are conventional methods of creating sets of objects. For instance, the creation of a set of objects is easily seen in any computer file system that offers multi-level subdirectories. Each subdirectory has a collection of objects. Similarly, e-mail programs have nested folders that allow the user to "file" e-mail correspondence into sets. Examples of this are Microsoft Outlook, Eudora, and Lotus Notes.

There are examples of Object Metadata, commonly known as "file attributes". Probably the most famous are DOS's "RHSA" bits. An enhancement came with the OS/2 operating system's use of Extended Attributes, which allowed user-defined attributes. However, we are not aware of any enhancements that kept Object-within-Set metadata. Presently conventional systems do not monitor a subdirectory to detect changes and perform processing based on those changes. The present invention addresses such a need.

SUMMARY OF THE INVENTION

A system and method for storing and managing sets of objects is disclosed. The method and system comprises providing a plurality of set nodes based upon a defined set of data objects; and associating a plurality of constraint nodes with the plurality of set nodes. The method and system includes providing a plurality of object nodes based upon the objects; and obtaining object metadata from the plurality of object nodes. The method and system further includes associating at least one of the plurality of object nodes with at least one of the plurality of set nodes based upon a criteria and detecting that at least one of the plurality of set nodes has is been modified and delivering a notification to at least one constraint node of a plurality of constraint nodes. Each of the plurality of constraint nodes provides constraints on at least one set node.

Accordingly, a method and system in accordance with the present invention unifies the storing and managing of sets in order to simplify overall system behavior. The system and method uses an attributed, directed graph model to store object metadata, object-within-set metadata, and set constraints. By using this model, no special cases exist when an object belongs to just one set or hundreds of sets. The operations required to maintain the graph model are the same in every case. The operations required to maintain the metadata and constraints are also the same in every case. The entire model is therefore a unified and simplified system.

DETAILED DESCRIPTION

The present invention relates generally to data objects in a processing system and more particularly to storing a managing of sets of objects. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is implemented in a computer or a computer network. In the preferred embodiment the present invention is implemented in a computer network, wherein client programs, also known as application programs, are not server-resident. Client programs are preferably external to the server so that they can operate on small size systems (e.g., personal computers, workstations, etc.). One of ordinary skill in the art will recognize that any client-server configuration may be used to implement the present invention, including a configuration. wherein the client programs are resident in any computer including the server.

Figure 1:
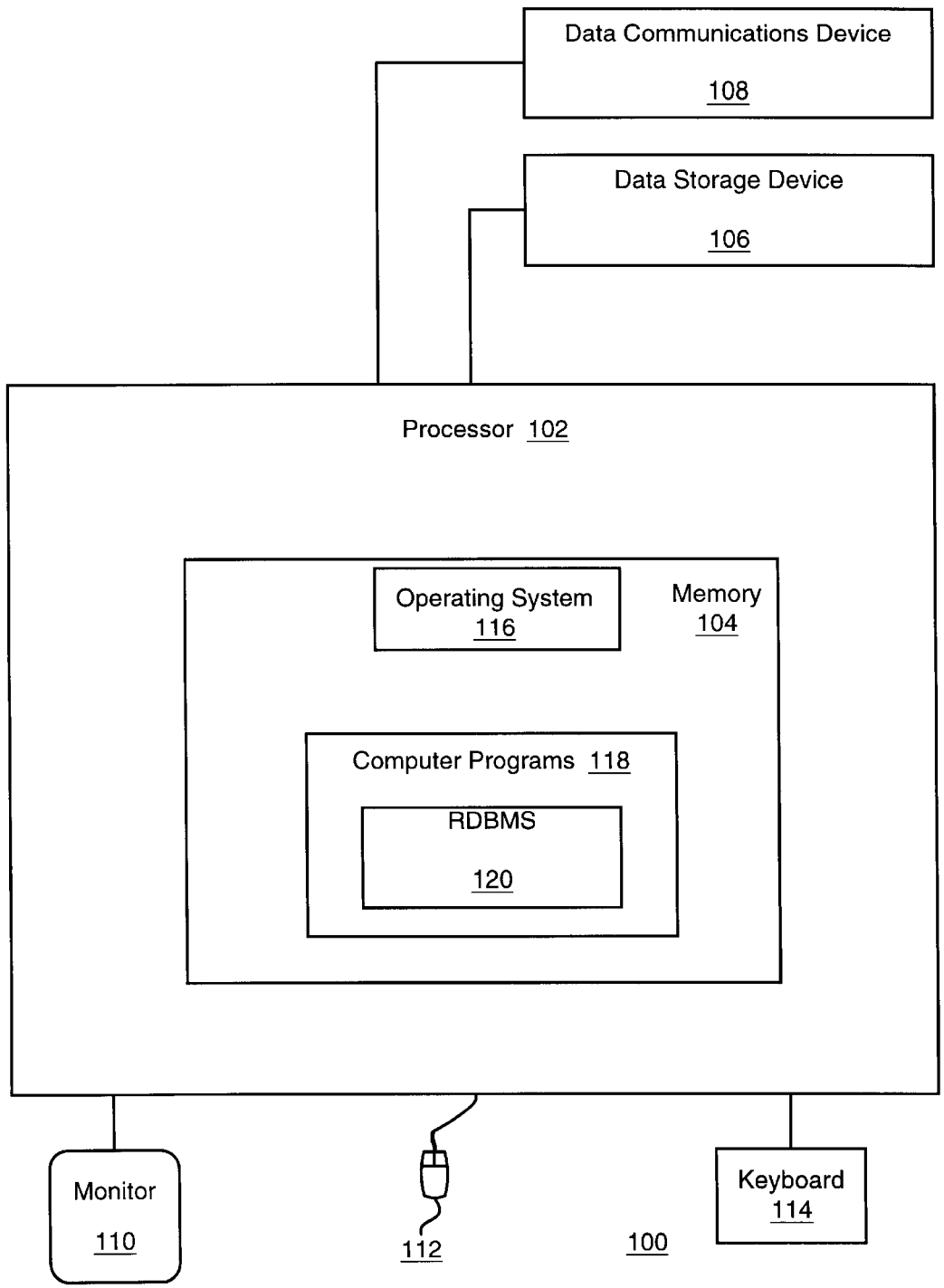
FIG. 1 illustrates a hardware environment used to implement the present invention.
Figure 2:
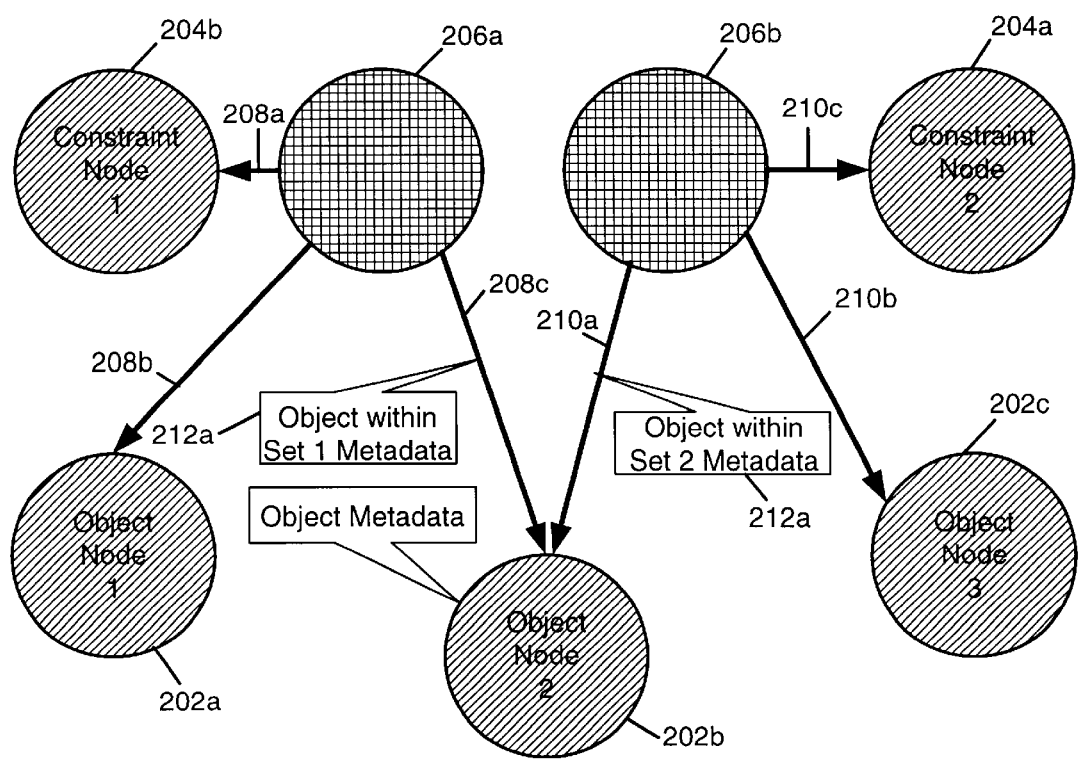
FIG. 2 is a diagram of the attributed, directed graph model in accordance with the present invention.

Accordingly, FIG. 1 illustrates a hardware environment used to implement the present invention. As illustrated in FIG. 2, in the preferred embodiment the present invention is implemented in a server computer ("server") 100. The server 100 generally includes, a processor 102, a memory 104 such as a random access memory (RAM), a data storage device 106 (e.g., hard drive, floppy disk drive, CD-ROM disk drive, etc.), a data communication device 108 (e.g., modem, network interface device, etc.), a monitor 110 (e.g., CRT, LCD display, etc.), a pointing device 112 (e.g., a mouse, a track ball, a pad or any other device responsive to touch, etc.) and a keyboard 114. It is envisioned that attached to the computer 100 may be other devices such as read only memory (ROM), a video card drive, printers, peripheral devices including local and wide area network interface devices, etc. One of ordinary skill in the art will recognize that any combination of the above system components may be used to configure the server 100.

The server 100 operates under the control of an operating system ("OS") 116, such as MVS™, AIX™, UNIX™, OS/2™, WINDOWS™, WINDOWS NT™, etc., which typically, is loaded into the memory 104 during the server 100 start-up (boot-up) sequence after power-on or reset. In operation, the OS 116 controls the execution by the server 100 of computer programs 118, including server and/or client-server programs. Alternatively, a system and method in accordance with the present invention may be implemented with any one or all of the computer programs 118 embedded in the OS 116 itself without departing from the scope of the invention. Preferably, however, the client programs are separate from the server programs and are not resident on the server.

The OS 116 and the computer programs 118 each comprise computer readable instructions which, in general, are tangibly embodied in or are readable from a media such as the memory 104, the data storage device 106 and/or the data communications device 108. When executed by the server 100, the instructions cause the server 100 to perform the steps necessary to implement the present invention. Thus, the present invention may be implemented as a method, apparatus, or an article of manufacture (a computer-readable media or device) using programming and/or engineering techniques to produce software, hardware, firmware, or any combination thereof.

The server 100 is typically used as a part of an information search and retrieval system capable of receiving, retrieving and/or dissemination information over the Internet, or any other network environment. One of ordinary skill in the art will recognize that this system may include more than one of server 100.

In the information search and retrieval system, such as a digital library system, a client program communicates with the server 100 by, inter alia, issuing to the server search requests and queries. The server 100 then responds by providing the requested information. The digital library system is typically implemented using a relational database management system software (RDBMS) 120 such as the DB2™ by IBM Corporation. The RDBMS 120 receives and responds to search and retrieval requests and termed queries from the client. In the preferred embodiment, the RDBMS 120 is server-resident.

In the digital library system, such as IBM Content Manager by IBM Corporation, a library server (such as server 100) performs a library server program ("server program") and an object server (such as server 100) performs a object server program (also "server program"). This dual-server digital library system is typically used as a large-scale information objects search and retrieval system which operates in conjunction with the RDBMS 120. Large-scale information objects ("objects") include a high resolution digital representation of ancient works of authorship and ancient works of art such as those found in the Vatican, as well as movies, classic and modem art collections, books, etc.

The objects themselves are typically stored in a relational database connected to the object server, and the information about the objects is stored in a relational database connected to the library server, wherein the server program(s) operate in conjunction with the RDBMS 120 to first store the objects and then to retrieve the objects. One of ordinary skill in the art will recognize that the foregoing is an exemplary configuration of a system which embodies the present invention, and that other system configurations may be used without departing from the scope and spirit of the present invention.

To take advantage of a system and method in accordance with the present invention, a connection server apparatus is necessary. A preferred embodiment of the connection server is disclosed in U.S. Pat. No. 5,687,367 entitled "Facility for the Storage and Management of Connection (Connection Server)" and assigned to the assignee of the present invention. The Connection Server is a general purpose, extensible facility, with accessible interfaces that can be included as a component in many systems. The Connection Server component is designed to provide a generic link management facility. The present invention creates a general-purpose facility for the storage and management of Connections that is tailorable, accessible, and tuneable for many purposes. Consumers of this service want to interact with this system with a minimum effort and be connected to associated objects with the least cost and time.

The Connection Server provides very flexible structures for the identification of objects to be interconnected, the identification of the links which connect them, and the auxiliary information needed to materialize objects when they are referenced.

The Connection Server is designed as a stand-alone reusable component. It interfaces with other independent components for services such as classification attributes, distributed database services, (object) storage, etc. Clean public programming interfaces are available for all components. It is independent from the "front-end", the user driven display of the Connections and associated metadata. It is independent from any authoring facilities which may be used to customize the services, metadata, etc., that are provided.

A method and system in accordance with the present invention addresses the requirements of storing and managing sets of data objects utilizing such a connection server system to resolve the links.

To more particularly describe the features of the present invention, refer now to the following description in conjunction with the drawings. FIG. 2 is a diagram 200 of the attributed, directed graph model in accordance with the present invention. Each node of the graph is a reference to an object; it is not the object itself. For instance, Object Node 202a could contain the URL string "http://www.ibm.com/docs/153263.pdf" 204b rather than the actual PDF document. Similarly, Constraint nodes 204 and Set nodes 206a–206b would also be references. The Metadata callouts store metadata in the form of "Attribute and Value".

Each edge 208a–208c and 210a–210c of the graph is a directed relationship beginning at a Set node 206a–206b and terminating at Constraint nodes 204a–204b or Object nodes 202a–202c. An edge is simply the pairing of two nodes. The metadata for the pairing is kept in a Metadata callout 212a–212b which is typically within the connection server.

Each Metadata callout stores metadata in the form of "Attribute and Value." This is also commonly known as "Property and Value". A Metadata callout can be associated with a Node or with an Edge. This allows attribution of Objects and attribution of Relationships between Objects.

In a preferred embodiment, all of the nodes have the same data structure. The same is true with Edges and Metadata callouts. Only the data within the data structure differs. By requiring the same data structures all nodes, edges and metadata callouts, the data structure and operations for the system are simplified. To more clearly describe the operation of a system and method in accordance with the present invention, refer now to the following description in conjunction with the related figures.

Figure 3:
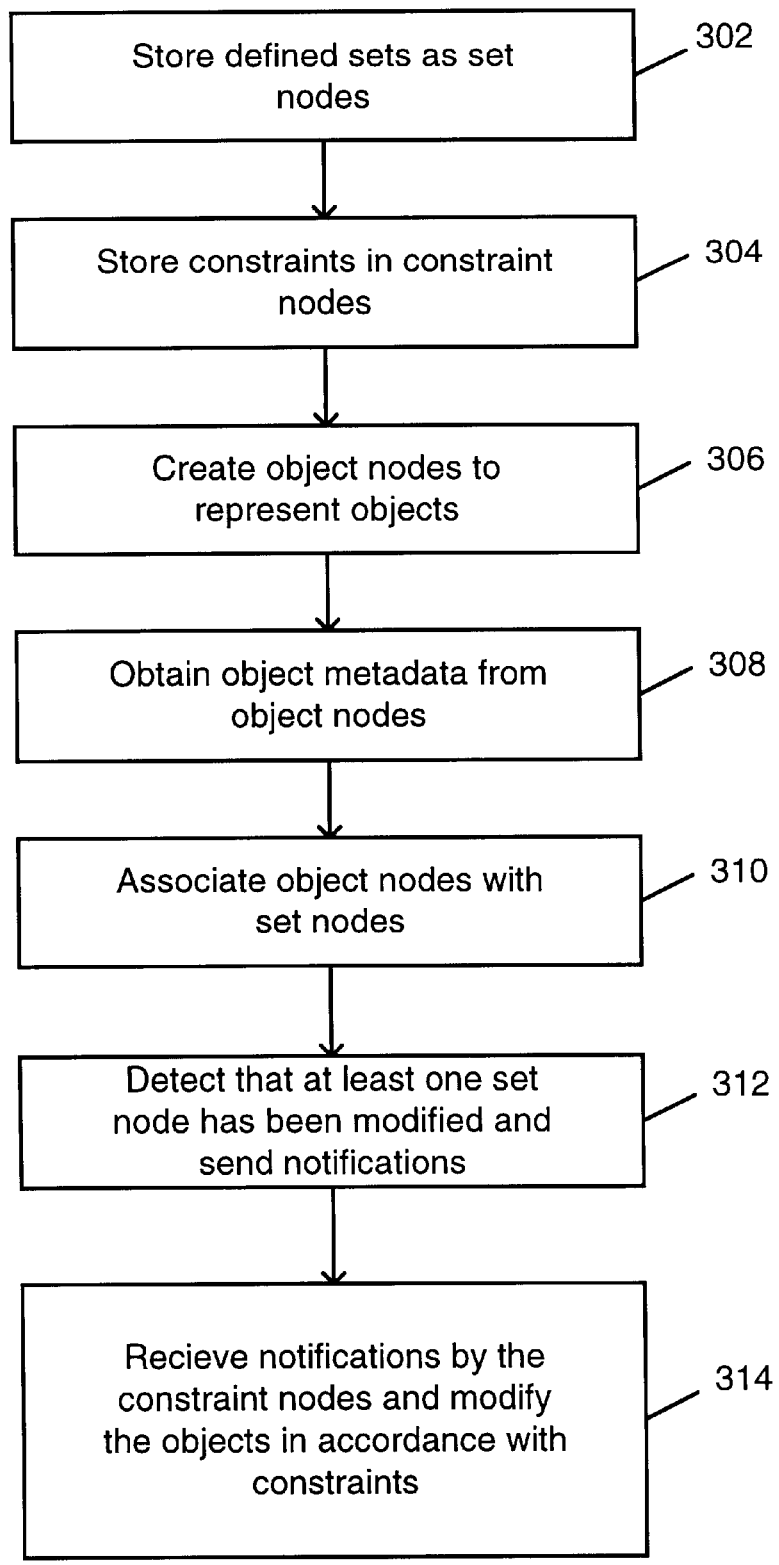
FIG. 3 illustrates a flow chart for storing and managing sets of objects.

FIG. 3 illustrates a flow chart for storing and managing sets. First, sets are defined and stored as Set nodes, via step 302. Next, constraints such as indexing or information mining actions, are stored as Constraint nodes and are associated with set nodes, via step 304. Thereafter, object nodes are created to represent Objects, via step 306. An example of an Object would be a PostScript document.

Objects are then mined for "Object Metadata" via step 308. For instance, a simple form of mining is to extract a normalized version of the text from a text document. Documents can be in various forms: HTML, PostScript, PDF, Microsoft Word, XML, etc. The normalized text from each of these document types would have the "markup language" stripped out; leaving only the text behind. Examples of Object Metadata are a metada standard such as: Dublin Core, categorization information, and summarization information.

An Object node is then associated with at least one set node, via step 310. Thereafter, an observer process detects that the Set has been modified and delivers notifications, via step 312. The observer process detects additions, modifications, and deletions.

Finally, processes associated with Constraint nodes receive notification and mine the new/changed/deleted Objects to satisfy Constraints on the Set, via step 314. Examples: (1) The Object may be added to the common index over the entire set. (2) The Object may be mined for Object-within-Set metadata.

Accordingly, a method and system in accordance with the present invention unifies the storing and managing of sets in order to simplify overall system behavior. The system and method uses an attributed, directed graph model to store object metadata, object-within-set metadata, and set constraints. By using this model, no special cases exist when an object belongs to just one set or hundreds of sets. The operations required to maintain the graph model are the same in every case. The operations required to maintain the metadata and constraints are also the same in every case. The entire model is therefore a unified and simplified system.

A system and method in accordance with the present invention has the advantage of ease in defining sets, adding members to sets, storing metadata about members of the sets, and enforcing constraints on the set members. Accordingly, the method and system is complete, consistent, and coherent.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing sets of objects comprising the steps of:
    (a) providing a first set node and a second set node based upon a defined set of data objects;
    (b) associating a first constraint node with the first set node and a second constraint node with the second set node, wherein the first constraint node references constraints for the first set node and the second constraint node references constraints for the second set node;
    (c) providing one or more object nodes based upon the objects;
    (d) obtaining object metadata from the one or more object nodes;
    (e) associating at least one object node with the first and second set nodes, wherein the at least one object node is subject to the constraints referenced by both the first and second constraint nodes;
    (f) detecting that the first set node has been modified and delivering a notification to the first constraint node; and
    (g) mining the object metadata of the at least one object node, so that the constraints referenced by the first and second constraint nodes are satisfied.

2. The method of claim 1 wherein the first and second set nodes are coupled to the first and second constraint nodes and the at least one object node by edges.

3. The method of claim 2 wherein a metadata callout is associated with either a node or an edge.

4. The method of claim 3 wherein one or more set nodes, one or more constraint nodes and one or more object nodes comprise the same data structure.

5. The method of claim 1 wherein the detecting step (f) is provided by an observer process.

6. The method of claim 1 wherein the object metadata obtaining step (d) comprises the step of (d1) extracting a normalized version of the text from the text document.

7. The method of claim 6 wherein the object metadata comprises categorization information.

8. The method of claim 6 wherein the object metadata comprises summarization information.

9. A system for managing sets of objects comprising the steps of:
    means for providing a first set node and a second set node based upon a defined set of data objects;
    means for associating a first constraint node with the first set node and a second constraint node with the second set node, wherein the first constraint node references constraints for the first set node and the second constraint node references constraints for the second set node;
    means for providing one or more object nodes based upon the objects;
    means for obtaining object metadata from one or more object nodes;
    means for associating at least object node with the first and second set nodes, wherein the at least one object node is subject to the constraints referenced by both the first and second constraint nodes;
    means for detecting that the first set node has been modified and delivering a notification to the first constraint node; and
    means for mining the object metadata of the at least one object node, so that the constraints referenced by the first and second constraint nodes are satisfied.

10. The system of claim 9 wherein the first and second set nodes are coupled to the first and second constraint nodes and the at least one object node by edges.

11. The system of claim 10 wherein a metadata callout is associated with either a node or an edge.

12. The system of claim 11 wherein one or more set nodes, one or more constraint nodes and one or more object nodes comprise the same data structure.

13. The system of claim 9 wherein the detecting means is provided by an observer process.

14. The system of claim 9 wherein the object metadata obtaining means comprises the means for extracting a normalized version of the text from the text document.

15. The system of claim 14 wherein the object metadata comprises categorization information.

16. The system of claim 14 wherein the object metadata comprises summarization information.

17. A computer readable medium containing program instructions for managing sets of objects comprising:
    (a) providing a first set node and a second set node based upon a defined set of data objects;
    (b) associating a first constraint node with the first set node and a second constraint node with the second set node, wherein the first constraint node references constraints for the first set node and the second constraint node references constraints for the second set node;

(c) providing one or more object nodes based upon the objects;

(d) obtaining object metadata from one or more object nodes;

(e) associating at least one object node with the first and second set nodes, wherein the at least one object node is subject to the constraints referenced by both the first constraint node and the second constraint node;

(f) detecting that the first set node has been modified and delivering a notification to the first constraint node;

(g) mining the object metadata of the at least one object node, so that the constraints referenced by the first and second constraint nodes are satisfied.

18. The method of claim 1, further comprising:

(k) detecting that the second set node has been modified and delivering a second notification to the second constraint node; and (l) mining the object metadata of the at least one object node, so that the constraints referenced by the first and second constraint nodes are satisfied.

19. The system of claim 9, further comprising:

means for detecting that the second set node has been modified and delivering a second notification to the second constraint node; and means for mining the object metadata of the at least one object node, so that the constraints referenced by the first and second constraint nodes are satisfied.

20. The medium of claim 17, further comprising instructions for:

(k) detecting that the second set node has been modified and delivering a second notification to the second constraint node; and (l) mining the object metadata of the at least one object node, so that the constraints referenced by the first and second constraint nodes are satisfied.

* * * * *